United States Patent [19]

Hidano

[11] Patent Number: 4,593,957

[45] Date of Patent: Jun. 10, 1986

[54] ROLLING BEARING MADE BY THIN STEEL PLATES FOR PROVIDING A RECTILINEAR MOVEMENT

[75] Inventor: Kengo Hidano, Fujisawa, Japan

[73] Assignee: Nippon Thompson Co., Ltd., Tokyo, Japan

[21] Appl. No.: 674,584

[22] Filed: Nov. 26, 1984

[51] Int. Cl.⁴ .................... F16C 21/00; F16C 29/04
[52] U.S. Cl. ........................................ 384/49; 384/50
[58] Field of Search ................... 308/6 R, 3 A, 3.8

[56] References Cited

U.S. PATENT DOCUMENTS

| | | | |
|---|---|---|---|
| 807,323 | 12/1905 | Shimer | 308/6 R |
| 2,702,582 | 2/1955 | Potter | 308/3.8 |
| 2,780,501 | 2/1957 | Rosenberg | 308/6 R |
| 2,951,728 | 9/1960 | Drake | 308/6 R X |
| 3,220,091 | 11/1965 | Reef | 308/3.8 X |
| 4,018,488 | 4/1977 | Manson | 308/3.8 X |

*Primary Examiner*—Stuart S. Levy
*Assistant Examiner*—Thomas R. Hannon
*Attorney, Agent, or Firm*—Trexler, Bushnell & Wolters, Ltd.

[57] ABSTRACT

In a rolling bearing for rectilinear movement which is made by thin steel plates, the thickness of thin steel plates of table and bed are set to be thicker than those of conventional ones in order to provide rigidity, then the steel plates are formed due to press forming so as to have U-shaped cross sections. Track grooves each having a V-cross section are formed in the side walls of the table and bed. The V-shaped track grooves are subjected to cutting work and heat treatment and thereafter they are ground in order to improve the accuracy. Thus, it is possible to provide a cheap and light-weight rolling bearing for rectilinear movement which has high accuracy and high rigidity and is fitted for mass production.

5 Claims, 29 Drawing Figures

FIG. 11
FIG. 12
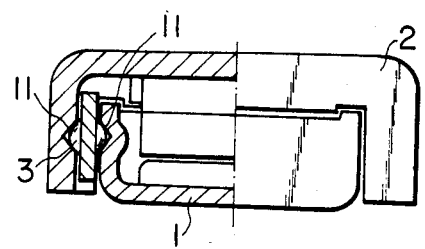
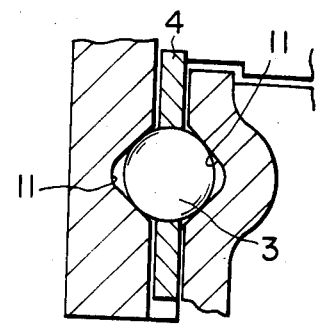
FIG. 12a
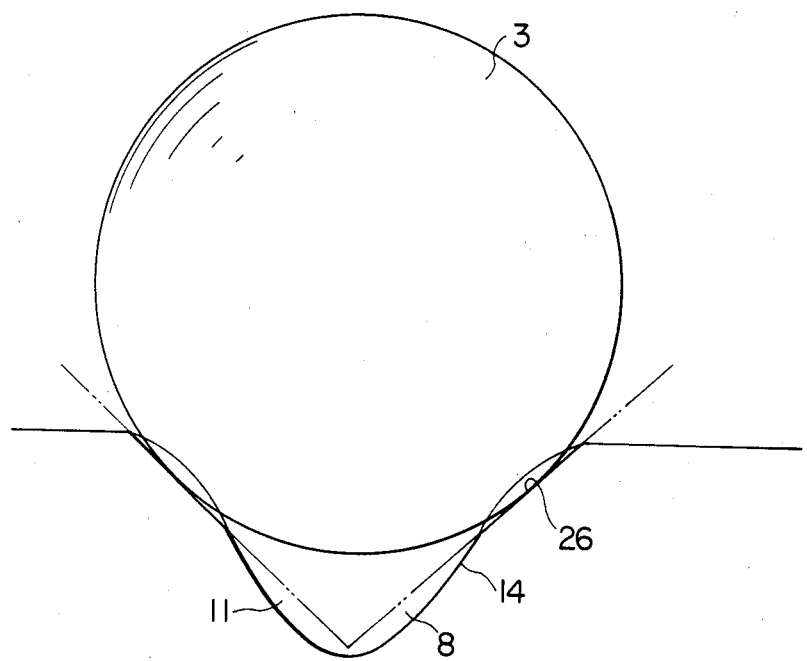

ROLLING BEARING MADE BY THIN STEEL PLATES FOR PROVIDING A RECTILINEAR MOVEMENT

FIELD OF THE INVENTION

The present invention relates to a rolling bearing for providing rectilinear movement and, more particularly, to a light-weight, cheap and high-precision roller bearing for providing a rectilinear movement in which a thin metal plate such as, for example, a high carbon steel plate, stainless steel plate, cemented steel plate, etc. is used as material of the table and bed of the rolling bearing.

BACKGROUND OF THE INVENTION

As disclosed in Japanese Patent Application Laid-open No. 80448/1974 and as shown in FIGS. 1 to 5 of the accompanying drawings as an embodiment, in a conventional roller bearing for providing a rectilinear movement, both a table 2' and a bed 1' are made of steel and are thick, so that the overall bearing structure is heavy and is time-consuming and expensive to manufacture due mainly to the cutting work necessary. Therefore, the number of processing steps is large and the manufacturing cost is high and this manufacturing method is not fitted for mass production. However, high accuracy can be maintained for a long time.

On the other hand, in the U.S. Pat. No. 2,889,181 as shown in FIG. 5A, a thick metal is used as the track member to make the bearing sufficiently rigid, and the track surface is further subjected to heat treatment and grinding in order to obtain high accuracy. Therefore, although the rolling bearing is expensive and heavy and is not fitted for mass production, high accuracy can be maintained for a long time.

However, such a rolling bearing for providing rectilinear movement is not fitted for use in the field where a light load is applied to such a bearing and where it is used in a small limited space. Therefore, there is a large demand for a miniaturized rolling bearing for rectilinear movement.

On the other hand, in U.S. Pat. No. 4,095,854 shown in FIG. 5B, a light-weight ball bearing which is suitable for mass production is disclosed. This bearing is used at, for example, the drawer portion or the like of an office cabinet. The track member is formed into a predetermined shape by being press formed and the track surface is also press formed to reduce the cost of the bearing. Therefore, this bearing is light-weight and suited for mass production and can be manufactured inexpensively. However, there are drawbacks in that the track member lacks rigidity, the hardness and accuracy, etc. of the track surfaces are insufficient, and high bearing accuracy cannot be maintained for a long time. Also, the applicable range is limited since it is used only in the field where the weight of a load which is applied to the bearing is a small and a high accuracy is not required.

SUMMARY OF THE INVENTION

It is an object of the present invention to provide a cheap and light-weight rolling bearing for rectilinear movement with high accuracy and high rigidity which eliminates the above-mentioned drawbacks of conventional bearings.

According to the present invention, in a rolling bearing for rectilinear movement comprising a table and a bed and rolling bodies, the table and the bed are formed by press forming so as to have U-shaped cross sections, respectively; the table and bed have elasticity; a pair of track grooves which face one another and each of which has substantially a V-shaped cross section are formed in the side walls of the table and bed; track surfaces which come into contact with the rolling bodies are formed in the track grooves; and the track surfaces are subjected to heat treatment and ground so as to have sufficient hardness, surface roughness and dimensional accuracy as the rolling bearing.

In addition, a method of manufacturing the bearing of the invention comprises the steps of: (a) making a table and a bed of the bearing from thin metal plates, respectively, and cutting them into predetermined dimensions; (b) bending each metal plate at predetermined portions by press forming so as to have a U-shaped cross section in the metal plates due to the cutting work and/or grinding work, thereby manufacturing the table and bed; and (d) assembling the table over the bed through a plurality of rolling bodies in those track grooves.

With such an arrangement as mentioned above, the rolling bearing of the present invention has the following effects.

(1) Since the track member is formed so as to have a U-shaped cross section and is light-weight, the inertial force upon reciprocating movement is small.

(2) Since the track member has sufficient rigidity and high accuracy, the applicable field of this bearing is wide.

(3) Since most of the machining operations are performed by press forming the labor cost is cheap and this method is fitted for mass production.

(4) Since the bearing spring elasticity, the work to apply a pre-pressure can be easily performed and the pre-pressure amount is stable also during the operation. (The track members are preliminarily mutually expanded as necessary and they are assembled by inserting the rolling bodies therebetween. It is also possible to preset the dimensions of track members and rolling bodies such that the pre-pressure is applied after the completion of the assembly.)

In addition, since most of the machining steps are performed by press forming in the method of manufacturing the bearing of the invention, the number of machining steps is less than that in the case where the bearing is manufactured due to mainly the cutting work as in a conventional example shown in FIG. 5A. Further, the track grooves are machined due to the cutting work and/or grinding work, so that the track members are light-weight and this manufacturing method is fitted for mass production similarly to the case of a conventional example shown in FIG. 5B; moreover, the bearing can be manufactured with a higher degree of accuracy than in the conventional example.

BRIEF DESCRIPTION OF THE DRAWINGS

FIG. 11 illustrates another embodiment of the invention and shows a similar diagram as FIG. 6;

FIG. 12 is a partially enlarged diagram of FIG. 11 and shows a similar diagram as FIG. 7;

FIGS. 12a to 12c illustrate diagrams for explaining the track groove in the embodiment of FIG. 11;

DESCRIPTION OF THE PREFERRED EMBODIMENTS

Figure 1:
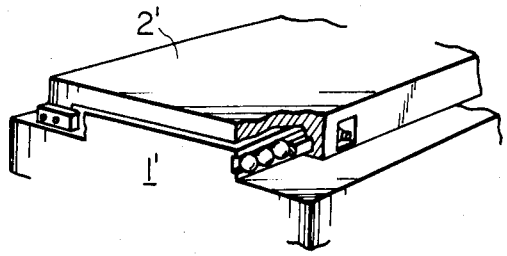
FIGS. 1 to 5 illustrate a conventional technology disclosed in Japanese Patent Application Laid-open No. 80448/1974.
Figure 2:
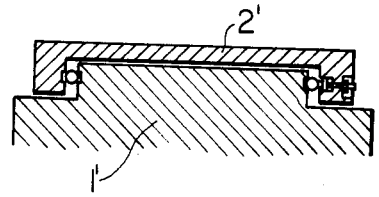
Figure 3:
Figure 4:
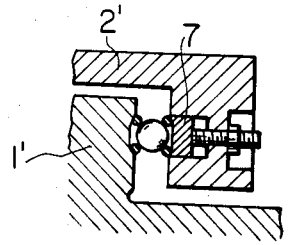
Figure 5:
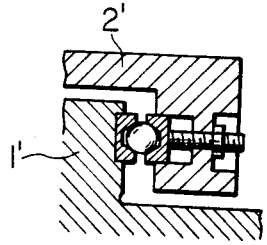
Figure 5A:
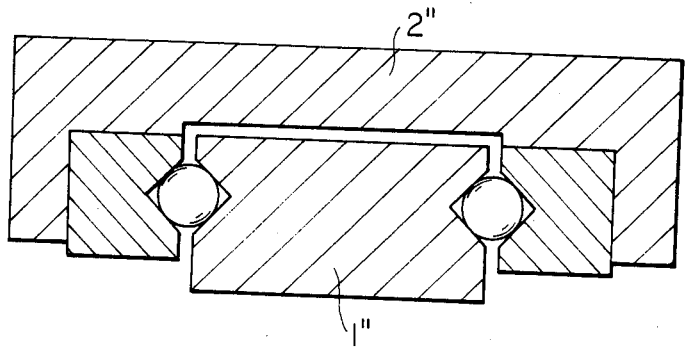
FIG. 5A shows a conventional technology disclosed in the U.S. Pat. No. 2,889,181.
Figure 5B:
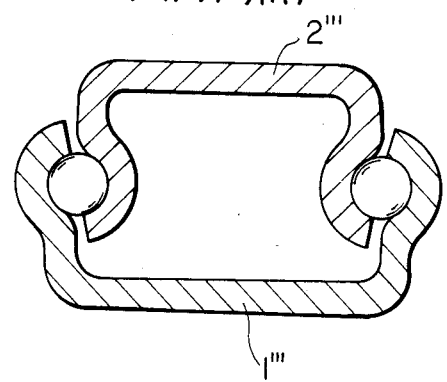
FIG. 5B shows a conventional technology disclosed in the U.S. Pat. No. 4,095,854.

The present invention will now be described in detail hereinbelow with reference to the accompanying drawings. In the drawings, the same parts and components are designated by the same reference numerals.

Figure 6:
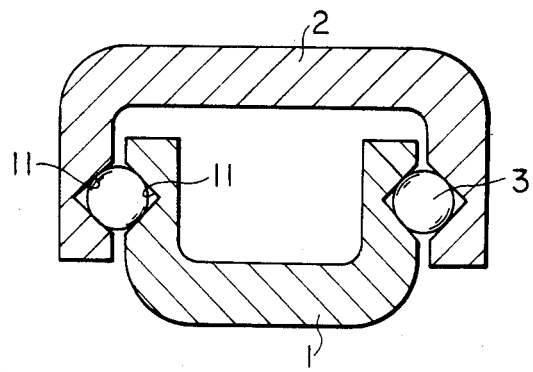
FIG. 6 is a front view showing one embodiment of a rolling bearing for rectilinear movement according to the present invention.
Figure 7:
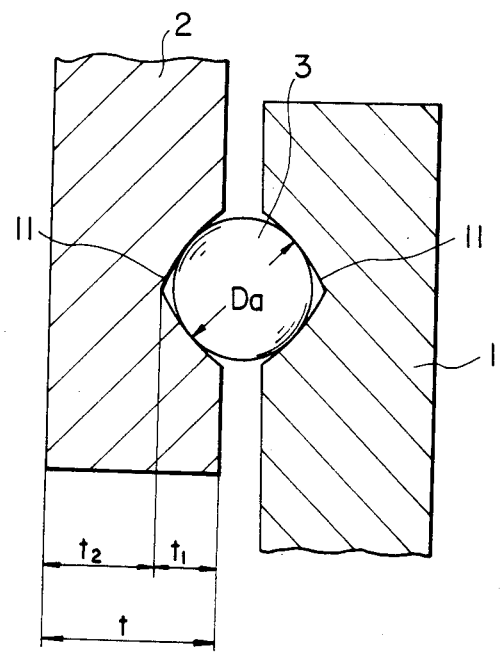
FIG. 7 is a partially enlarged diagram of FIG. 6 illustrating V-shaped track grooves.
Figure 8:
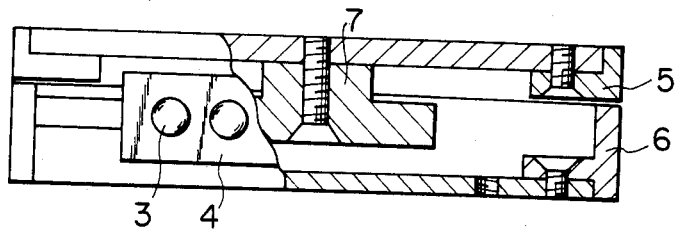
FIG. 8 is a side elevational view with a part cut away of FIG. 6.

FIGS. 6 to 8 illustrate one embodiment of a rolling bearing for providing a limited rectilinear movement according to the present invention. As will be most clearly understood from FIG. 6, track grooves 11 each having a V-shaped cross section are formed at the central portions of the outside surfaces of the walls of both sides of a bed 1 having a U-shaped cross section along the longitudinal direction (in the direction perpendicular to the paper). In correspondence to the track grooves 11, similar track grooves 11 each having a V-shaped cross section are formed in the inside surface of the walls on both sides of a table 2 having a U-shaped cross section along the longitudinal direction. The bed 1 and table 2 are assembled through the intermediary of a plurality of rolling bodies, namely, balls 3 between the respective track grooves.

Retainers 4 (refer to FIG. 9) are provided to promote rolling of the balls and to maintain a constant distance between the balls.

The thickness of bed 1 and table 2, the depths of track grooves and the diameter of each ball will then be explained with reference to FIG. 7. The relation between the thickness t and the depth $t_1$ of track grove 11 and the relation between the diameter $D_a$ of the ball and minimum thickness $t_2$ immediately under the track groove are represented by the following equations in consideration of the rigidity of the track member.

$$t_1/t = 0.2 \text{ to } 0.5$$

$$t_2 \geq D_a/3$$

Referring now to FIG. 8, table side plates 5 and bed side plates 6 to restrict the strokes are respectively attached to both side end portions of each of the table and bed. A stop member 7 is also attached to the top wall of the table. The stop member 7 serves to prevent the table from colliding with the bed side plate 6 and further progressing when the table moves forward or backward. However, the stroke amount can be also restricted by only the side plate without attaching the stop member as necessary. (In this case, the side plate on the side of the bed may not be attached).

When this bearing is installed into an apparatus, attaching holes (not shown) are formed at proper locations of the table 2 and bed 1 and the bearing is fixed by use of bolts and nuts through these holes.

Figure 9:
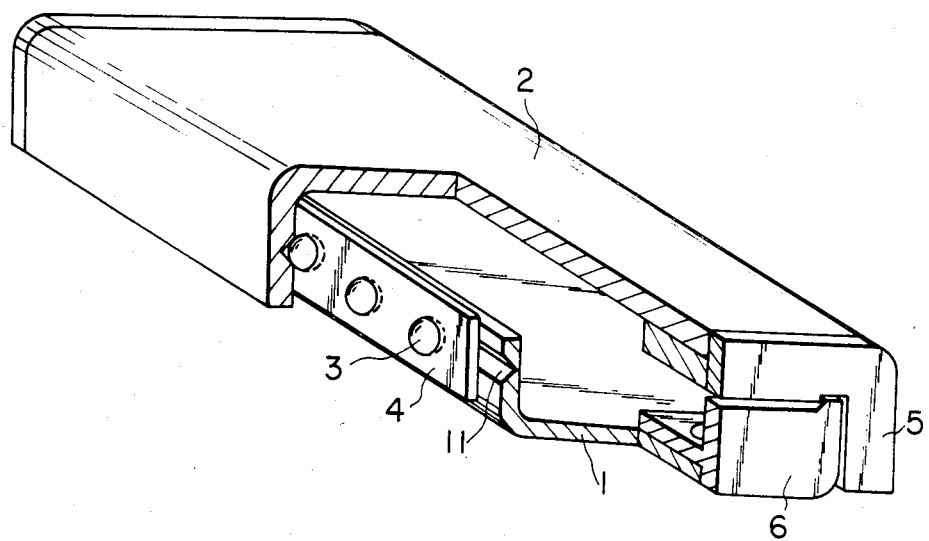
FIG. 9 is a perspective view of one embodiment showing the assembly of the bearing according to the invention.

The assembly state of this bearing is clearly illustrated in FIG. 9. Next, the assemblying method of the bearing will be explained mainly with reference to FIG. 8.

Figure 10:
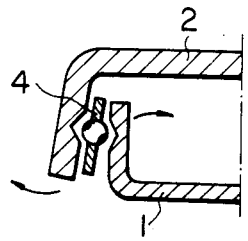
FIG. 10 shows an assembly method of the same.

(1) One side plate 6 is attached to the bed 1.
(2) One side plate 5 and stop member 7 are attached to the table 2.
(3) The balls 3 are fitted into the retainers 4.
(4) After completion of attachment of the parts in the above steps (1) to (3), the other side plates are attached to the other ends of the bed and table. In this case, the table 2 is expanded or the bed 1 is contracted by a use of a mechanical stressing thereof and the elasticity of the thin metal plate. Otherwise, by performing both of them, the parts in steps (1) to (3) can be easily assembled (refer to FIG. 10). On the other hand, if the metal plate is bent in the opposite direction (in the direction so as to press the balls), a predetermined pre-pressure can be applied.

Another embodiment of the invention will be explained with reference to FIGS. 11, 12 and 12a to 12c. In this embodiment (hereinafter, referred to as the second embodiment), the V-shaped track groove 11 has a gentle wavy curve formed due to press forming. Only a part of the groove 11 is ground and machined to form a track surface 26 (FIG. 12a) for the ball 3. The other points are the same as the embodiment in FIGS. 6 to 10 (hereinafter, referred to as the first embodiment).

Figure 12B:
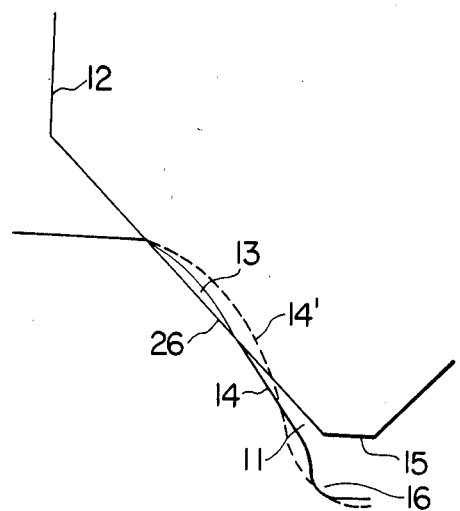
Figure 12C:
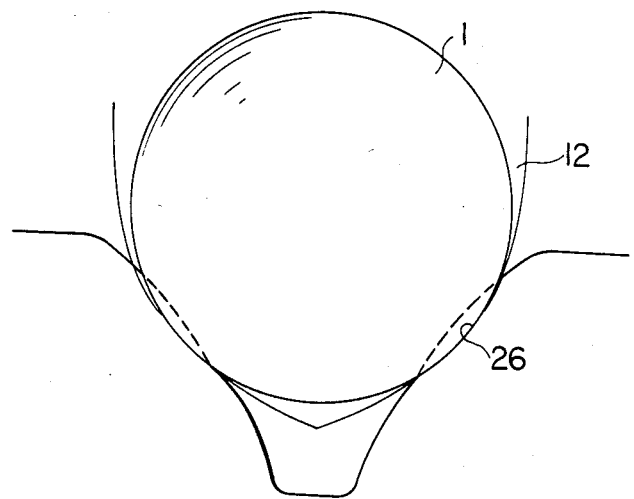

The track groove 11 in this embodiment will be explained with reference to FIGS. 12a to 12c. FIG. 12a shows the shape after the outside surface of the sidewall of the track groove 11 formed in the bed was ground and machined. Since the track groove 11 having a V-shaped cross section is formed due to plastic working (such as by press working or the like), it has a gentle wavy curve 14. Only parts of both slant surfaces (consisting of the wavy curve 14) of the curve 14 are ground by a V-shaped grindstone, thereby forming the track surfaces 26 shown in FIG. 12a.

According to this embodiment, only the track surfaces which are necessary for the bearing are formed by grinding, so that this makes it possible to further realize improvement in service life of the grindstone, and uniformity of the dimensional accuracy and surface roughness. In addition, as compared with the V-shaped track grooves, an increase 8 of an oil pocket (refer to FIG. 12a) is accomplished, so that a good lubricating effect is obtaned and there are effects such that the service life as the bearing becomes extended.

Although the edge of the grindstone is sharply pointed in FIG. 12a, in case of ensuring a large track area, it can be realized by use of a grindstone 12 having a chamfered edge portion 15 as shown in FIG. 12b.

On the other hand, as shown in FIG. 12b, a concave groove may be formed in the bottom portion of the track groove having a V-shaped cross section as necessary in order to provide a further larger oil pocket 16. FIG. 12b also indicates that if the side surface of the groove is formed so as to become a wavy curve 14' (indicated by a broken line) having a relatively wide bottom as necessary a ground working clearance 13 will be enlarged, so that the large track surface after the grinding can be assured. In addition, as shown in FIG. 12c, the track surface 26 is formed as a curve surface to enlarge the contact area with the ball, thereby enabling the strength to be increased.

Figure 13A:
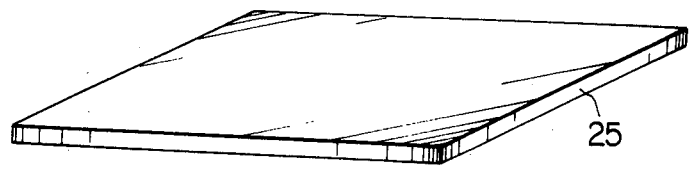
FIGs. 13a to 13c are diagrams for explaining a method of manufacturing the bed or table according to the embodiment of FIG. 6 of the invention.
Figure 13B:
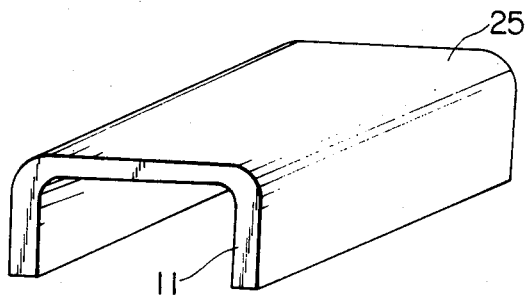
Figure 13C:
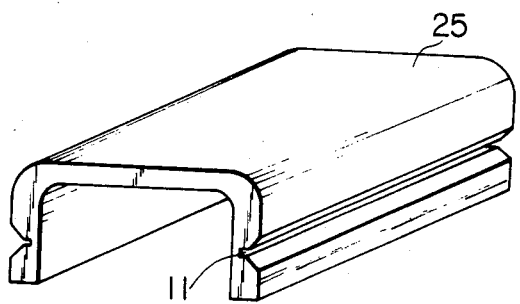
Figure 15A:
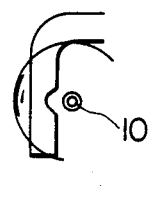
FIG. 15a shows the undesirable position of the heat source to harden the local portion.
Figure 15B:
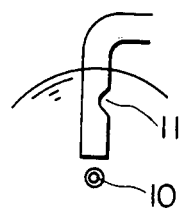
FIG. 15b shows the desirable position of the heat source to harden the local portion.

Next, a method of manufacturing the table 2 and bed 1 in the first embodiment will be described. In order to manufacture the table 2 and bed 1, a thin metal plate 25 is cut into a predetermined dimension as shown in FIG. 13a. Next, as shown in FIG. 13b, the metal plate is bent so as to have a U-shaped cross section due to the plastic deformation (press forming). The track grooves 11 each having a V-shaped cross section are formed in the metal plate 25 due to the cutting work and/or grinding work as shown in FIG. 13c. When the metal plate is bent so as to have a U-shaped cross section due to the plastic deformation, the bending portions protrude outside. Therefore, by forming notched portions in the portion of the metal plate 25 where it is bent into a U-shaped cross section and in the edge portions of the track grooves, and thereafter by bending the metal plate due to the plastic deformation, the projections of the bending portions can be prevented. In the case where such notched portions are not formed, after the metal plate was plastically deformed as a U-shape, the protruded portions of the bending portions may be removed by cutting work and/or grinding work. On one hand, the track surfaces 26 of the track groove 11 may be subjected to heat treatment and finished by the grinding work after the cutting work. Or the cutting work may be omitted and the track surfaces 26 may be formed by only the grinding work. Next, as shown in FIG. 15b, heat sources 10 are disposed at both end portions aong the longitudinal direction of the metal plate to harden the local portions. Although the method shown in FIG. 15b indicates the partial hardening method, if a general heat treatment to harden the whole table and bed is performed, the whole rigidity can be more increased. As shown in FIG. 15a, in a method whereby the heat source 10 is disposed near the track groove, there is a large possibility such that the bending portion is also hardened; thus, control is difficult and the metal plate will have been broken when it is bent. As shown in FIG. 15b, according to the method whereby the heat source 10 is disposed at the edge portion along the longitudinal direction of the table or bed, the distance from the heat source 10 to the bending portion is long; therefore, the hardening portion can be easily controlled. As an embodiment to harden the local portion, for instance, a tool steel (SK-5) is heated for 2.5 seconds at 870±5° C. due to high frequency quenching shown by a heat source which is disposed at the position shown in FIG. 15b; this tool steel is then cooled by quenching; it is then subjected to annealing for one hour at 180±7° C.; it is cooled in a furnace.

The table and bed which were manufactured in the manner as described above are assembled and the necessary number of balls are disposed in the track grooves, thereby completing the ball bearing.

Figure 14A:
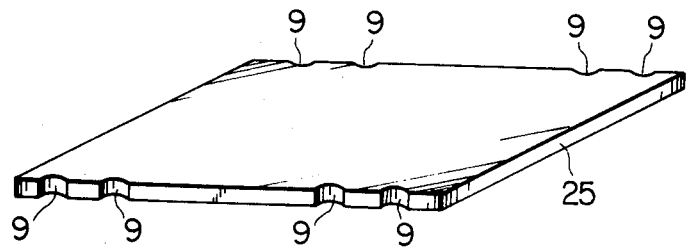
FIGS. 14a to 14c are diagrams for explaining a method of manufacturing the bed or table in the embodiment shown in FIG. 11.
Figure 14B:
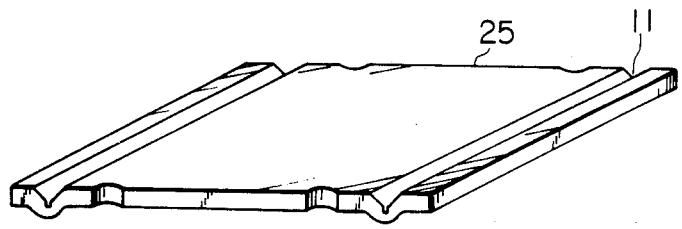
Figure 14C:
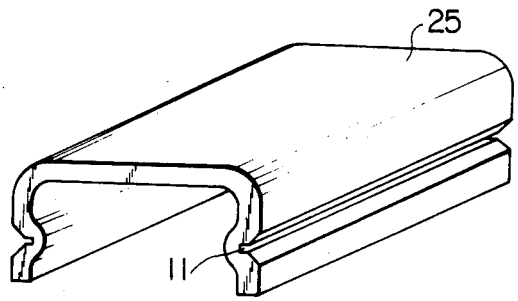

The method of manufacturing the table 2 and bed 1 in the second embodiment of the invention is shown in FIGS. 14a to 14c. This method is substantially identical to that in the case of the first embodiment except the following points. Namely, in the case of the second embodiment, as shown in FIG. 14b, prior to the U-shaped plastic deformation of the metal plate 25, the track grooves 11 each having a V-character shaped cross section are formed in the metal plate 25 due to the plastic deformation; this point is different from the case of the first embodiment (see FIG. 13b). As shown in FIG. 14c, after the track grooves 11 have been formed, the metal plate is bent at notched portions 9 so as to have U-shaped cross sections due to the plastic deformation. In this case, it is also possible to directly perform the plastic deformation of the track grooves 11 and the platic deformation to bend the metal plate into the U-shaped cross ssections by a single step from the state shown in FIG. 14a to the state shown in FIG. 14c. Then, as shown in FIG. 15b, the heat sources 10 are disposed at both end portions aong the longitudinal direction of the metal plate to harden the local portions, and thereafter only parts of the track groove of the V-shaped cross section of the metal plate are ground and worked, thereby forming the track surfaces 26 as shown in FIGS. 12a to 12c.

Figure 16:
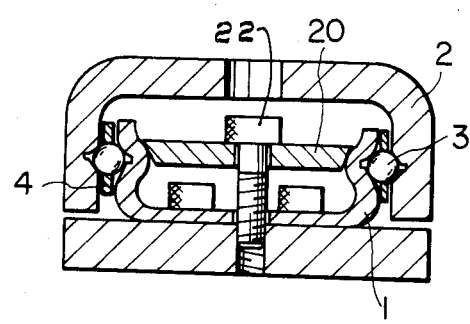
FIG. 16 is a cross sectional front view illustrating another embodiment of a rolling bearing for rectilinear movement according to the invention.
Figure 17:
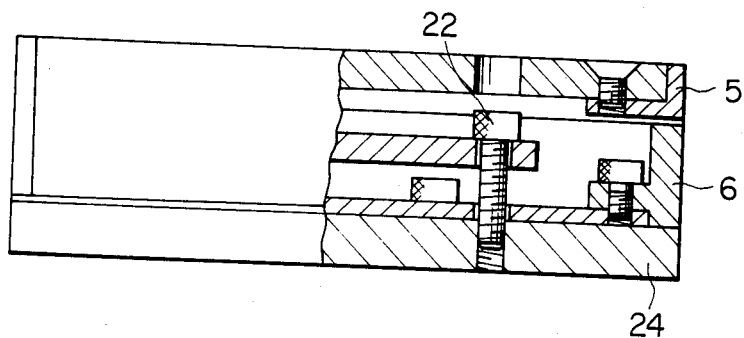
FIG. 17 is a side elevational view with a part cut away of FIG. 16.

FIGS. 16 and 17 illustrate the third embodiment of a rolling bearing for rectilinear movement according to the invention. In this embodiment, a pre-pressuring control plate 20, a pre-pressuring control screw 22 and a base 24 are further provided. By adjusting the pre-pressuring control screw 22, the pre-pressuring control plate 20 is pushed, thereby enabling the desired pre-pressure to be imparted to the balls 3. The pre-pressuring control screw 22 is screwed into the base 24.

Figure 18:
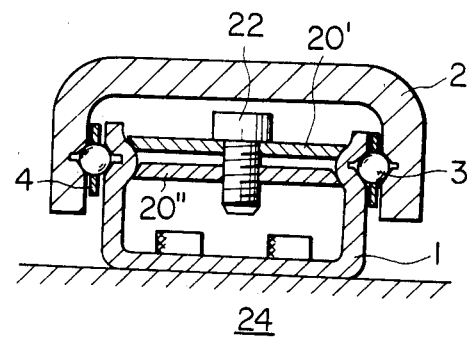
FIG. 18 is a cross sectional front view illustrating still another embodiment of a rolling bearing for rectilinear movement according to the invention.

FIG. 18 illustrates an embodiment whereby upper and lower pre-pressuring control plates 20' and 20" are disposed and by turning the pre-pressuring control screw 22, these upper and lower pre-pressuring control plates are made to approach one another, thereby causing the side surfaces of the bed 1 to be forced toward the table 2 and applying a pre-pressure. According to this embodiment, there is an effect such that the pre-pressure can be adjusted by the device installed in the bearing without fixedly attaching the bolt to the base 24.

Figure 19:
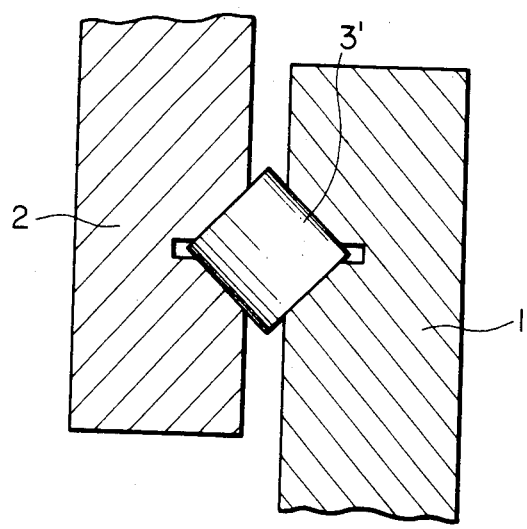
FIG. 19 shows a still another embodiment of the invention.

In the illustrated embodiments, the rolling bodies have been represented as the balls 3. However, it should be understood that the term "rolling bodies" used in the present invention includes rollers (3'), as can be seen from FIG. 19.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope and claims of the invention.

What is claimed is:

1. A rolling bearing for a rectilinear movement having a table, a bed and a plurality of like rolling bodies, comprising:

a table and a bed each of which is formed due to plastic working so as to have a U-shaped cross section, said table and bed having elasticity;

a pair of track grooves formed in the side walls of said table and bed so as to face each other and have substantially a V-shaped cross-section, respectively; and track surfaces formed in said track grooves so as to come into contact with said rolling bodies, wherein said track surfaces are heat treated and ground so as to have sufficient hardness, surface roughness and dimensional accuracy as a rolling bearing; and the thickness of the side wall at the thinnest portion of each of said table and bed, adjacent said track groove, is either equal to or slightly greater than one-third of the diameter of one of said rolling bodies.

2. A bearing according to claim 1, wherein said V-shaped track groove of said bed has a gentle wavy curve which is formed due to plastic working, and only a part of said V-shaped track groove is ground and thereby to form the track surface for the rolling bodies.

3. A bearing according to claim 1, wherein each of said V-shaped track grooves of said table and bed has a gentle wavy curve which is formed due to plastic working, and only a part of said V-shaped track groove is ground and thereby to form the track surface for the rolling bodies.

4. The bearing according to claim 1, wherein said rolling bodies are balls.

5. The bearing according to claim 1, wherein said rolling bodies are rollers.

* * * * *